(12) United States Patent
Xu et al.

(10) Patent No.: US 8,833,742 B2
(45) Date of Patent: Sep. 16, 2014

(54) CO-CURRENT VAPOR-LIQUID CONTACTING APPARATUSES FOR OFFSHORE PROCESSES

(75) Inventors: Zhanping Xu, Inverness, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 599 days.

(21) Appl. No.: 13/229,531

(22) Filed: Sep. 9, 2011

(65) Prior Publication Data

US 2013/0062792 A1 Mar. 14, 2013

(51) Int. Cl.
| | | |
|---|---|---|
| *B01F 3/04* | (2006.01) | |
| *B01D 3/28* | (2006.01) | |
| *B01D 3/24* | (2006.01) | |
| *B01D 3/32* | (2006.01) | |

(52) U.S. Cl.
CPC .. *B01D 3/24* (2013.01); *B01D 3/28* (2013.01); *B01D 3/324* (2013.01)
USPC ..................................... 261/114.1; 261/114.5

(58) Field of Classification Search
CPC ............. B01D 3/24; B01D 3/324; B01D 3/28
USPC ........... 261/114.1, 114.2, 114.3, 114.4, 114.5
See application file for complete search history.

(56) References Cited

U.S. PATENT DOCUMENTS

| | | | |
|---|---|---|---|
| 3,550,916 A | 12/1970 | Hoppe et al. | |
| 4,311,564 A * | 1/1982 | Aldridge | 203/99 |
| 4,361,469 A | 11/1982 | Trutna | |
| 4,627,941 A | 12/1986 | Bentham | |
| 4,762,651 A * | 8/1988 | Parker et al. | 261/114.1 |
| 5,098,615 A | 3/1992 | Resetarits | |
| 5,223,183 A | 6/1993 | Monkelbaan et al. | |
| 5,573,714 A | 11/1996 | Monkelbaan et al. | |
| 5,837,105 A * | 11/1998 | Stober et al. | 203/40 |
| 6,682,633 B1 * | 1/2004 | Xu et al. | 203/1 |
| 6,739,585 B1 | 5/2004 | Urbanski et al. | |
| 7,204,477 B2 | 4/2007 | Xu et al. | |
| 7,270,316 B2 | 9/2007 | Burch | |
| 7,506,861 B2 | 3/2009 | Muller | |
| 7,981,201 B2 * | 7/2011 | Xu | 96/296 |
| 8,020,838 B2 * | 9/2011 | Heldwein et al. | 261/114.5 |
| 8,052,126 B2 * | 11/2011 | Xu et al. | 261/110 |
| 8,262,787 B2 * | 9/2012 | Xu | 96/243 |

(Continued)

FOREIGN PATENT DOCUMENTS

WO 2006076923 A1 7/2006

*Primary Examiner* — Charles Bushey
(74) *Attorney, Agent, or Firm* — Mark Goldberg

(57) ABSTRACT

An offshore co-current vapor-liquid contacting apparatus includes stages having contacting modules. Each contacting module includes a downcomer extending in a direction and has downcomer baffles distanced from each other in the direction to define downcomer cells within the downcomer. Each downcomer includes an outlet proximate to a co-current flow channel. A receiving pan extends substantially parallel to the downcomer and has receiving pan baffles distanced from each other in the direction to define receiving pan sections within the receiving pan. A vapor-liquid separation device has an inlet surface proximate to the co-current flow channel and an outlet surface above the receiving pan. Ducts are provided, with each duct having an upper end in fluid communication with a respective receiving pan section and a lower end in fluid communication with a selected downcomer cell in an immediately inferior stage.

20 Claims, 5 Drawing Sheets

(56) References Cited

U.S. PATENT DOCUMENTS

| | | | |
|---|---|---|---|
| 8,413,967 B2* | 4/2013 | Johnson et al. | 261/113 |
| 8,608,833 B2* | 12/2013 | Xu | 95/213 |
| 2003/0011084 A1 | 1/2003 | Bosmans et al. | |
| 2004/0134836 A1 | 7/2004 | Muller | |
| 2009/0047194 A1 | 2/2009 | Nascimento et al. | |
| 2010/0162890 A1* | 7/2010 | Xu | 95/213 |
| 2010/0242730 A1 | 9/2010 | Heldwein et al. | |
| 2010/0244290 A1 | 9/2010 | Xu | |

\* cited by examiner

CO-CURRENT VAPOR-LIQUID CONTACTING APPARATUSES FOR OFFSHORE PROCESSES

TECHNICAL FIELD

This document generally relates to apparatuses for performing co-current vapor-liquid contacting in mass and/or heat transfer operations, and more particularly relates to such apparatuses for performing co-current vapor-liquid contacting under non-vertical conditions experienced in rocking or tilted offshore-based columns.

BACKGROUND

Vapor-liquid contacting devices, such as fractionation trays and packings, are employed to perform an almost endless variety of separations in the petroleum and petrochemical industries. Fractionation trays are used in the separation of many different hydrocarbons including paraffins, aromatics and olefins. Fractionation trays are also used to separate specific compounds such as alcohols, ethers, alkylaromatics, monomers, solvents, inorganic compounds, and atmospheric gases in the separation of broad boiling mixtures such as petroleum-derived fractions. Vapor-liquid contacting trays are also used to perform gas processing, purification, and absorption.

While a wide variety of fractionation trays and other contacting devices with differing advantages and disadvantages have been developed, fractionation trays and packings are the predominant form of conventional fractional distillation apparatus. They are widely used in the chemical, petrochemical and petroleum refining industries to promote vapor-liquid contacting performed in vessels such as fractionation columns. Trays are mounted horizontally, typically at uniform vertical distances referred to as the tray spacing of the column.

Fractional distillation has traditionally been conducted in cross flow or counter current contacting devices that exhibit an overall downward liquid flow and upward vapor flow. The vapor and liquid phases are brought into contact at contacting stages to allow the vapor and liquid phases to exchange components and approach equilibrium with each other. The vapor and liquid are then separated, moved in the appropriate direction and contacted again with another quantity of the appropriate fluid. In many conventional vapor-liquid contacting devices, vapor and liquid are contacted in a cross flow arrangement at each stage. An alternative apparatus differs from traditional multi-stage contacting systems in that while the overall flow in the apparatus continues to be countercurrent, each stage of actual contacting between the liquid and vapor phases is performed in a co-current mass transfer zone.

During the fractional distillation process using co-current vapor-liquid contacting devices, vapor generated at the bottom of the column rises, coming into contact with liquid exiting downcomer. The contact between the vapor and liquid causes the liquid to form droplets which are entrained in the vapor and carried upward. As a result, the vapor and liquid share a flow path for at least a short period. During the period of entrainment, a compositional equilibrium between the vapor and liquid phases is approached. During mass transfer, the vapor loses less volatile material to the liquid and thus becomes slightly more volatile as it passes upward through the vessel. Simultaneously the concentration of less volatile compounds in the liquid increases as the liquid moves downward from tray to tray. The liquid laden vapor passes through a separation device where the liquid is removed. The liquid separated from the vapor travels downward to the next lower tray. This continuous entrainment and vapor-liquid separation is performed on each tray. Vapor-liquid contactors therefore perform the two functions of contacting the rising vapor with liquid and then allowing the two phases to separate and flow in different directions. When the steps are performed a suitable number of times, the process leads to separation of chemical compounds based upon their relative volatility.

Two very important characteristics of vapor-liquid contacting equipment in which improvement is always sought are capacity and efficiency. A co-current contacting device is believed to be one apparatus for achieving high capacity through use of vapor-liquid separation devices such as demisters or centrifugal vanes that enhance vapor-liquid separation at each stage. The co-current contacting device can also achieve high mass transfer efficiency through the co-current contacting of fine liquid droplets with vapor.

If an unbalanced or maldistributed liquid flow occurs in a vapor-liquid contacting apparatus from operation under non-vertical conditions, i.e., if the vessel itself is rocking or tilted, fluid may not be readily redistributed along the mass transfer zones of the apparatus. The maldistribution of liquid may propagate from one stage to the next, reducing the capacity and efficiency of the apparatus.

Accordingly, it is desirable to provide a co-current vapor-liquid contacting apparatus that inhibits or eliminates unbalanced or maldistributed liquid in contacting stages. It is also desirable to provide a co-current vapor-liquid contacting apparatus that inhibits liquid flow horizontally within and between contacting stages under non-vertical conditions. Furthermore, other desirable features and characteristics of the co-current vapor-liquid contacting apparatus will become apparent from the subsequent detailed description and the appended claims, taken in conjunction with the accompanying drawings and this background.

BRIEF SUMMARY

Co-current vapor-liquid contacting apparatuses are provided. In accordance with one exemplary embodiment, an offshore co-current vapor-liquid contacting apparatus comprises a plurality of stages, with each stage including at least one contacting module. Each contacting module is provided with a downcomer extending in a direction and provided with downcomer baffles distanced from each other in the direction to define downcomer cells within the downcomer. Further, each downcomer cell is provided with an outlet proximate to a co-current flow channel. Each contacting module also includes a receiving pan extending substantially parallel to the downcomer and provided with receiving pan baffles distanced from each other in the direction to define receiving pan sections within the receiving pan. Also, each contacting module includes a vapor-liquid separation device having an inlet surface proximate to the co-current flow channel and an outlet surface above the receiving pan. A plurality of ducts are provided, with each duct having an upper end in fluid communication with a respective receiving pan section and a lower end in fluid communication with a selected downcomer cell in an immediately inferior stage. The offshore co-current vapor-liquid contacting apparatus inhibits maldistribution of liquid in the plurality of stages.

In another embodiment, a co-current vapor-liquid contacting apparatus is provided for offshore operation in non-vertical conditions. The apparatus includes a plurality of stages, and each stage includes at least one contacting module. Each contacting module is provided with a downcomer including a plurality of downcomer cells. Each downcomer cell is provided with an outlet proximate to a co-current flow channel. Each contacting module also includes a receiving pan having a plurality of receiving pan sections. A vapor-liquid separation device has an inlet surface proximate to the co-current flow channel and an outlet surface above the receiving pan. A plurality of ducts is provided, with each duct having an upper end in fluid communication with a respective receiving pan section and a lower end in fluid communication with a selected downcomer cell in an immediately inferior stage.

In accordance with another exemplary embodiment, an offshore co-current vapor-liquid contacting apparatus comprises a plurality of stages, and each stage includes at least one contacting module. Each contacting module is provided with a downcomer including downcomer cells, and each downcomer cell is provided with an outlet proximate to a co-current flow channel. Each contacting module also includes a receiving pan having receiving pan sections. A vapor-liquid separation device has an inlet surface proximate to the co-current flow channel and an outlet surface above the receiving pan. Each contacting module includes a plurality of ducts in fluid communication with respective receiving pan sections and selected downcomer cells in the immediately inferior stage. Further, the contacting apparatus is provided with means for inhibiting liquid flow from a first downcomer cell to adjacent downcomer cells and for inhibiting liquid flow from a first receiving pan section to adjacent receiving pan sections.

BRIEF DESCRIPTION OF THE DRAWINGS

Exemplary embodiments will hereinafter be described in conjunction with the following drawing figures, wherein like numerals denote like elements, and wherein.

DETAILED DESCRIPTION

The following detailed description is merely exemplary in nature and is not intended to limit the co-current vapor-liquid contacting apparatus or the application and uses of the co-current vapor-liquid contacting apparatus. Furthermore, there is no intention to be bound by any theory presented in the preceding background or the following detailed description.

Various exemplary embodiments contemplated herein are directed to co-current vapor-liquid contacting apparatuses for operation in offshore vessels experiencing non-vertical conditions. Land-based co-current vapor-liquid contacting apparatuses are disclosed in U.S. Pat. No. 7,424,999, the entirety of which is incorporated by reference herein. The present apparatuses are configured to prevent or minimize unbalanced or maldistributed liquid in contacting stages that would otherwise occur in non-vertical conditions, such as those often experienced in offshore operations. Typically, unbalanced or maldistributed liquid in contacting stages results in inefficient vapor-liquid contact, which is herein minimized or avoided.

Figure 1:
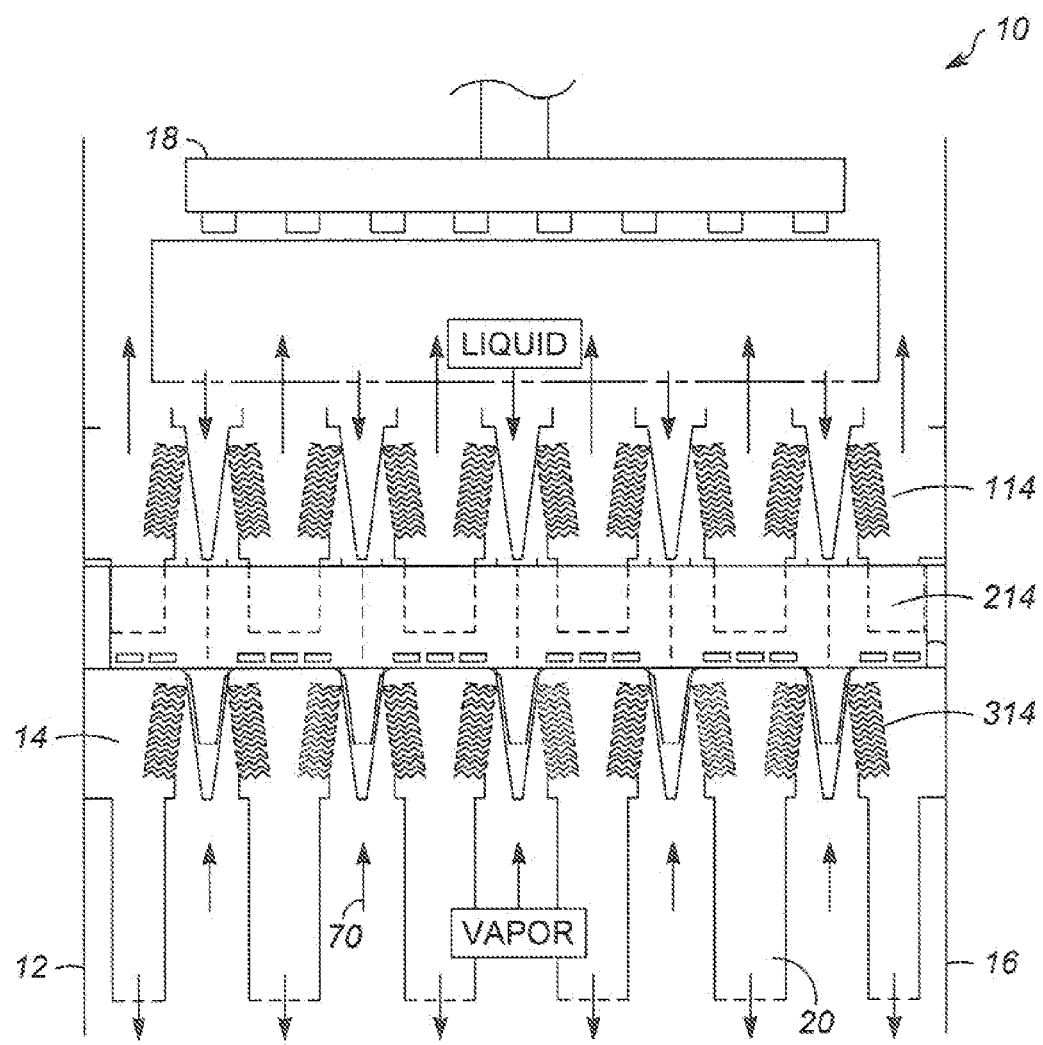
FIG. 1 is a cross-sectional view of a vapor-liquid contacting vessel employing multiple contacting stages having co-current vapor-liquid contacting modules in accordance with an exemplary embodiment.

An exemplary offshore co-current vapor-liquid contacting apparatus 10 is illustrated in FIG. 1. As shown, the apparatus 10 is housed in an offshore vessel 12, which may be for example a distillation column, absorber, direct contact heat exchanger, or other vessel used to conduct vapor-liquid contacting. The apparatus 10 is particularly suited for vessels 12 that experience non-vertical orientations, i.e., vessels 12 that rock or tilt, such as those at sea. The vessel 12 contains contacting stages 14 for contacting vapor and liquid.

As shown, the vessel 12 includes an outer shell 16 that is typically in the form of a cylinder. An upper portion of the vessel 12 contains a top collector/distributor 18 and a lower portion of the column contains a bottom collector/distributor 20. For simplicity, only a top contacting stage 114, one intermediate contacting stage 214, and a bottom contacting stage 314 are shown, with stages 114 and 314 having a same orientation and with stage 214 having a substantially perpendicular orientation. Despite the alternating orientation, each of the contacting stages 114, 214, 314 is substantially structurally identical within a section of the apparatus 10 where no fluid is added to or withdrawn from the section and may be collectively or singly referred to as contacting stage 14. When referring to adjacent stages herein, the reference stage is referred to as contacting stage 14, an upper adjacent stage is referred to as superior stage and a lower adjacent stage is referred to as inferior stage. FIG. 1 represents only a section of the apparatus when there are no fluid feeds or withdraws between top and bottom of the vapor-liquid contacting apparatus.

Figure 2:
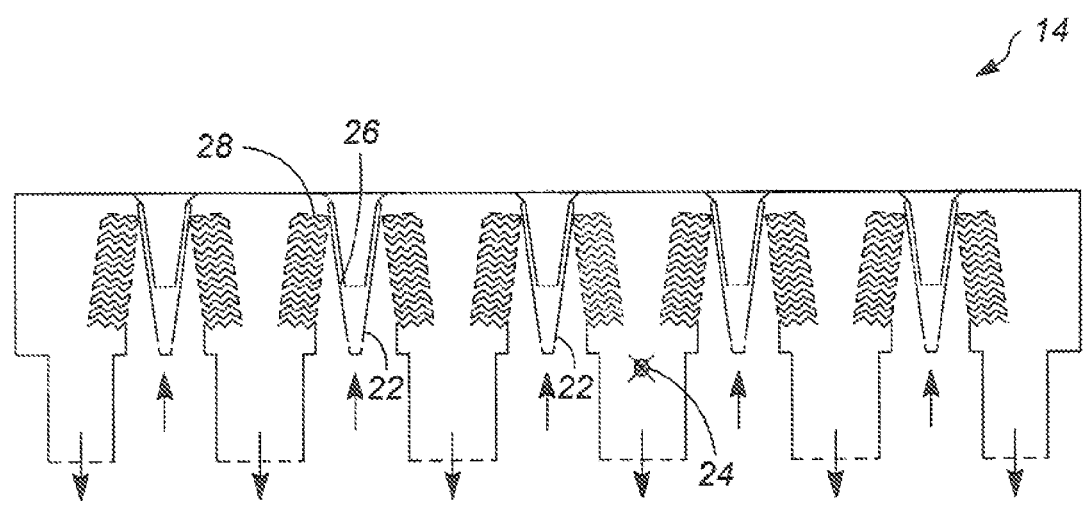
FIG. 2 is a cross-sectional view of a contacting stage of FIG. 1 in accordance with an exemplary embodiment.
Figure 3:
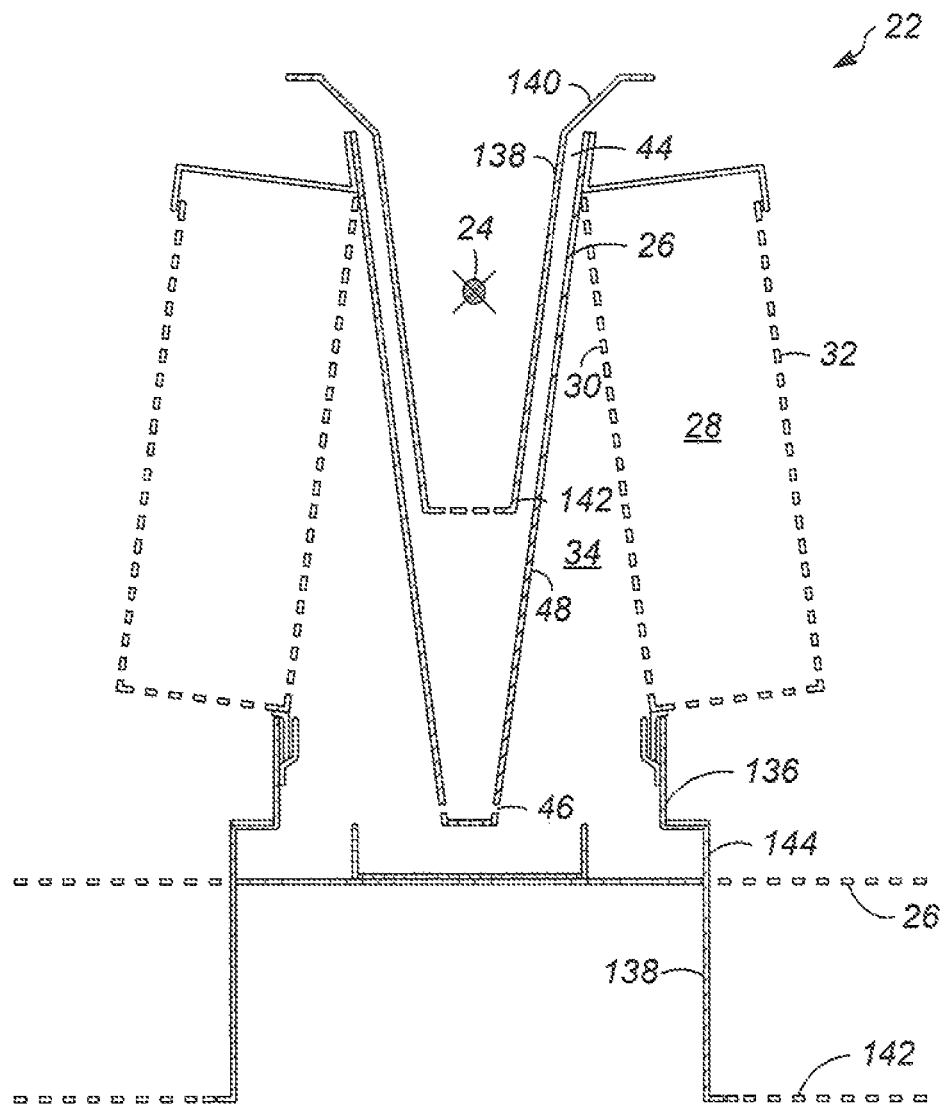
FIG. 3 is a cross-section view of a contacting module of FIGS. 1 and 2 in accordance with an exemplary embodiment.

Referring to FIG. 2, each contacting stage 14 is shown to include contacting modules 22. It is noted that each of the contacting modules 22 in the contacting stage 14 of FIG. 2 extends lengthwise into the drawing page as identified by directional arrow symbol 24. FIG. 3 shows that each contacting module 22 includes a downcomer 26 located between a pair of vapor-liquid separation devices 28, such as demisters. The vapor-liquid separation devices 28 are porous and include inlet surfaces 30 and outlet surfaces 32. As shown, the downcomer 26 and vapor-liquid separation devices 28 extend in the direction 24 of the respective contacting stage 14. The downcomer 26 and inlet surfaces 30 of the vapor-liquid separation devices 28 cooperate to define co-current flow channels 34. A receiving pan is provided below the outlet surface 32 of each vapor-liquid separation device 28. For adjacent downcomers 26, a single receiving pan may be positioned between and shared by the downcomers 26. Structurally, each receiving pan 136 is connected to ducts 138. As shown, each duct 138 may have an enlarged upper end 140 in fluid communication with the receiving pan 136. As may be understood, each duct 138 has a lower end 142 in communication with a downcomer 26 in an immediately inferior contacting stage.

In FIG. 3, the downcomer 26 has a downcomer inlet 44 in an upper portion and a plurality of downcomer outlets 46 in a lower portion. Two sloped downcomer side walls 48 taper the downcomer 26 inwardly in the downward direction. The bottom of the substantially trough-shaped or V-shaped downcomer 26 may be pointed, curved, or may be flat as shown in FIG. 3. Alternative embodiments having downcomers 26 of various different shapes, such as stepped or sloped and stepped, may be envisioned. However, the V-shaped downcomer 26 is used in the present embodiment to provide a combination of a large contacting volume between the vapor-liquid separation devices 28 and downcomer side walls 48 and a large downcomer inlet 44 in the upper portion for accommodating reception of ducts 138 from receiving pans 136 in superior stages to increase liquid handling capability. As shown the downcomer inlet 44 is configured to engage the duct 138 from the superior stage. FIG. 3 also shows part of the duct 138 and downcomer 26 in the lower stage which runs substantially perpendicular to the upper stage. Two end walls 144 of the ducts 138 are shown in the lower stage as straight vertical rather than tapered down as the two side walls as shown in the upper stage.

The downcomer outlets 46 are formed by a plurality of slots or other types of perforations arranged in one or more rows proximate to the bottom of the downcomer 26. The downcomer outlets 46 may be located in the downcomer side walls 48 and/or the bottom of the downcomer. In operation, a liquid level in the downcomer 26 provides a seal to prevent the ascending vapor from entering the downcomer through the downcomer outlets 46. The perforations are preferably distributed along the length of the downcomer 26 and they may be arranged such that the perforations are varied in size or number or eliminated. Thus, arrangement of the downcomer outlets 46 may be used as another means to prevent liquid from flowing directly from one downcomer into an inferior downcomer. Combinations of these and other such means discussed afterwards may be used to prevent or minimize this potential for liquid to by-pass a contacting stage 14.

Figure 4:
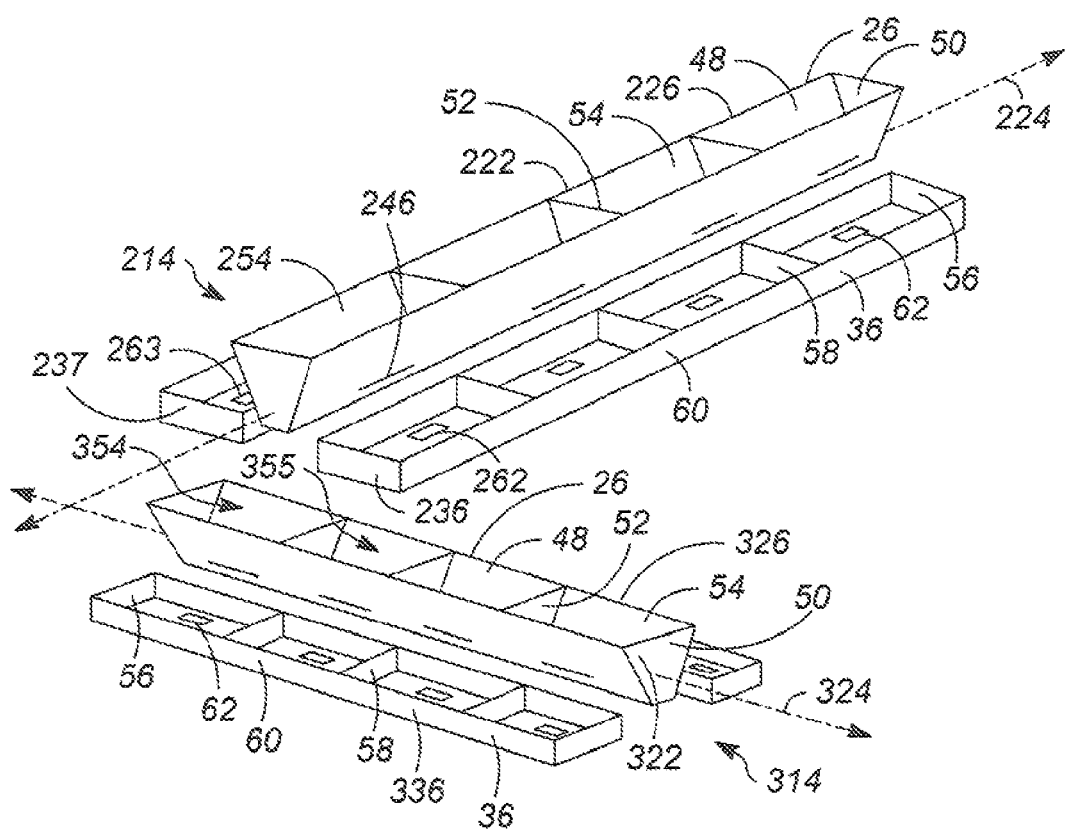
FIG. 4 is a perspective view (not to scale) showing partially the components of a superior contacting module and an inferior contacting module in accordance with an exemplary embodiment.

In FIG. 4, a contacting module 222 in a representative stage 214 and a contacting module 322 in the immediately inferior stage 314 are illustrated. For purposes of clarity, each stage is shown with only one contacting module 222, 322, and each contacting module is shown with only one downcomer 226, 326 and its associated receiving pans 236, 336. Further, the vapor-liquid separation devices 28 and ducts 38 are not shown. In FIG. 4, the preferred relative orientations of contacting module 222 in stage 214 and contacting module 322 in inferior stage 214 are illustrated. As shown, contacting module 222 extends in direction 224 while inferior contacting module 322 extends in direction 324 transverse to direction 224. Preferably, directions 224 and 324 are substantially perpendicular. For the preferred apparatus 10, adjacent stages alternate between orientations extending along directions 224 and 324 from top to bottom in each section of the vessel 12.

Still referring to FIG. 4, it can be seen that each downcomer 226, 326 includes imperforate downcomer end walls 50 and a plurality of imperforate downcomer baffles 52. Each downcomer end wall 50 and downcomer baffle 52 is interconnected between the downcomer side walls 48 to provide a barrier to liquid flow in the direction 224, 324, respectively. As a result, a plurality of downcomer cells 54 is defined. Similarly, the receiving pan 236, 336 is provided with imperforate receiving pan end walls 56, imperforate receiving pan baffles 58, and receiving pan side walls 60. Each receiving pan end wall 56 and receiving pan baffle 58 is interconnected between the receiving pan side walls 60 to provide a barrier to liquid flow in the direction 224, 324, respectively. As a result, a plurality of receiving pan sections 62 is defined.

Figure 5:
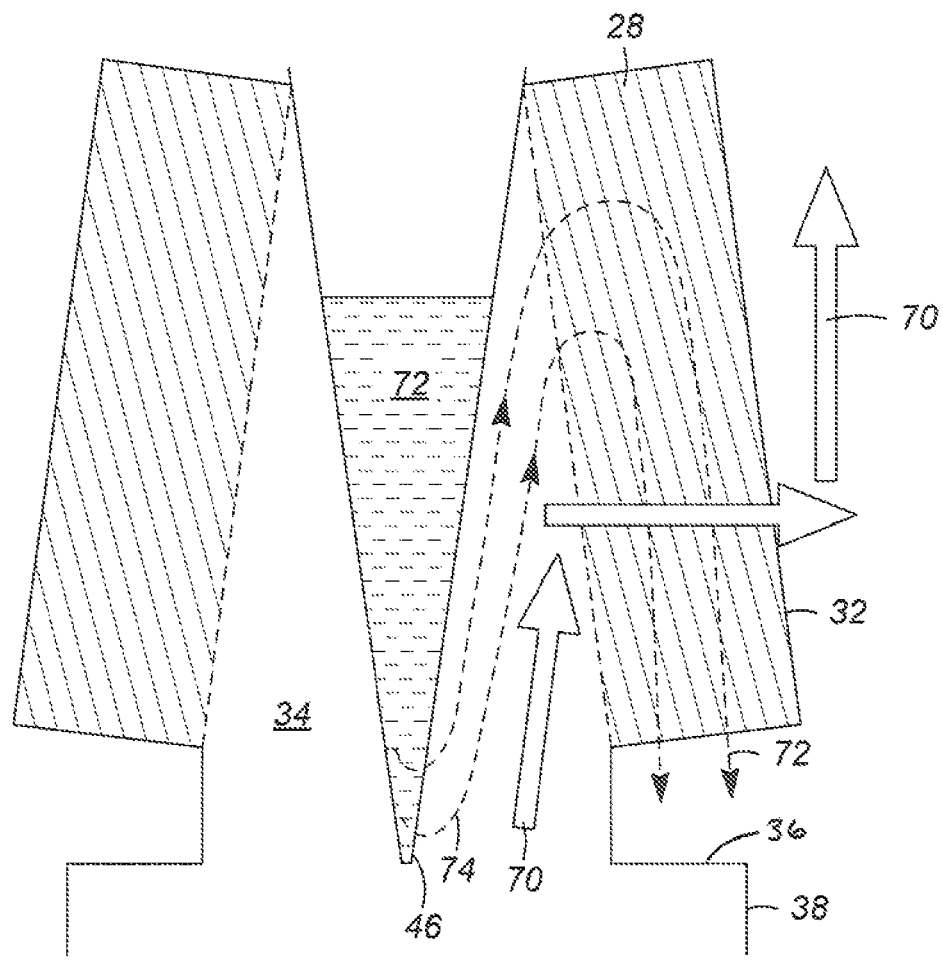
FIG. 5 is a cross-sectional view depicting vapor and liquid flow through a contacting module during vapor-liquid contact in accordance with an exemplary embodiment.

Cross-referencing FIGS. 3 and 5, vapor-liquid contact in each contacting module 22 is illustrated. As shown, vapor (identified by arrow 70) rises from an inferior stage. At the same time, liquid 72 flows into the downcomer 26 from one or more ducts of the superior stage and exits through the downcomer outlets 46. When the liquid 72 enters the co-current flow channels 34, it is carried with the vapor 70 in the form of entrained liquid droplets 74 into one of the vapor-liquid separation devices 28. In each vapor-liquid separation device 28, the entrained liquid droplets 74 are trapped and thus separated from the vapor as the vapor-liquid mixture passes through the vapor-liquid separation device 28. The vapor continues through the vapor-liquid separation device 28 and exits through the outlet surface 32 while the liquid drains downward to be received via duct 38 in the receiving pan 36 located below the vapor-liquid separation device 28. The vapor then rises to the superior stage while the liquid drains through a duct into a downcomer in the inferior stage.

In view of the vapor-liquid contact and movement explained above, reference is again made to FIG. 4. Liquid (not shown) exiting a first downcomer cell 254 (selected from downcomer cells 54) through an associated first downcomer outlet 246 (selected from downcomer outlets 46) will pass through an adjacent vapor-liquid separation device (not shown) and then drain into a first receiving pan section 262 (selected from receiving pan sections 62) in a first receiving pan 236 (selected from receiving pans 36), or into a first receiving pan section 263 (selected from receiving pan sections 62) in a second receiving pan 237 (selected from receiving pans 36). Thereafter, the liquid will drain through a duct (not shown) into the downcomer 326 in the inferior stage. Specifically, the liquid will drain into a first downcomer cell 354 (selected from downcomer cells 54) in the first downcomer 326, or an adjacent second downcomer cell 355 (selected from downcomer cells 54) in the first downcomer 326. The vapor-liquid co-current contact described in FIG. 5 is then repeated in the inferior stage.

As can be seen, liquid is mostly accumulated in downcomers and receiving pans. The liquid flow along the downcomers and receiving pans due to rocking and tilt are restricted by baffles 52 and 58. As a result of this ability to limit liquid flow, imbalanced and maldistributed liquid load along downcomers and receiving pans due to tilting and/or rocking of the vessel to non-vertical orientations is prevented or minimized During non-vertical conditions in a conventional contacting stage, liquid in a downcomer or a receiving pan will run to the lower side under the force of gravity, leaving higher side of the downcomers or receiving pans with less or no liquid. During such conditions, vapor/liquid ratio in the co-current flow channels will be far from uniform resulting in inefficient vapor-liquid contacting and mass transfer. In the apparatus provided for offshore use herein, liquid maldistribution along the length of downcomers and receiving pans is inhibited and the vapor-liquid contact inefficiency is reduced.

Accordingly, an offshore co-current vapor-liquid contacting apparatus for operation in non-vertical conditions has been provided. From the foregoing, it is to be appreciated that the exemplary embodiments of the co-current vapor-liquid contacting apparatus restrict horizontal movement of liquid within downcomer cells and receiving pan sections. By minimizing or preventing unbalanced or maldistributed liquid in contacting stages, efficiency of the vapor-liquid contact process is optimized.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the co-current vapor-liquid contacting apparatus in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the appended claims and their legal equivalents.

What is claimed is:

1. An offshore co-current vapor-liquid contacting apparatus comprising a plurality of stages, with each stage including at least one contacting module comprising:
   a downcomer extending in a direction and having downcomer baffles distanced from each other in the direction to define downcomer cells within the downcomer, wherein each downcomer cell is provided with an outlet proximate to a co-current flow channel;
   a receiving pan extending substantially parallel to the downcomer and having receiving pan baffles distanced from each other in the direction to define receiving pan sections within the receiving pan;
   a vapor-liquid separation device having an inlet surface proximate to the co-current flow channel and an outlet surface above the receiving pan; and
   a plurality of ducts, wherein each duct has an upper end in fluid communication with a respective receiving pan section and a lower end in fluid communication with a selected downcomer cell in an immediately inferior stage;
   wherein the apparatus inhibits maldistribution of liquid on each stage.

2. The apparatus of claim 1 wherein the direction that each downcomer in a respective stage extends is transverse to the direction that each downcomer in the immediately inferior stage extends.

3. The apparatus of claim 1 wherein the direction that each downcomer in a respective stage extends is substantially perpendicular to the direction that each downcomer in the immediately inferior stage extends.

4. The apparatus of claim 1 wherein each stage includes a plurality of contacting modules.

5. The apparatus of claim 1 wherein each downcomer is positioned between two adjacent receiving pans.

6. The apparatus of claim 5 wherein the contacting modules are configured in each stage to restrict liquid flow from a first downcomer cell to adjacent downcomer cells.

7. The apparatus of claim 6 wherein the contacting modules are configured in each stage to restrict liquid flow from the first receiving pan section to adjacent receiving pan sections.

8. The apparatus of claim 1 wherein each downcomer cell has a length of less than about 24 inches and each receiving pan segment has a length of less than about 24 inches.

9. The apparatus of claim 1 wherein each downcomer has opposing side walls, wherein each downcomer cell has an outlet through each sidewall, wherein each outlet is proximate to a co-current flow channel, and wherein each contacting module comprises a vapor-liquid separation device proximate to each co-current flow channel.

10. The apparatus of claim 1 wherein each downcomer is substantially trough-shaped, with two side walls and two end walls, and wherein each end wall is distanced from a respective downcomer baffle to define a respective terminal downcomer cell.

11. A co-current vapor-liquid contacting apparatus for offshore operation in non-vertical conditions, the apparatus comprising a plurality of stages, with each stage including at least one contacting module comprising:
   a downcomer including a plurality of downcomer cells, wherein each downcomer cell has an outlet proximate to a co-current flow channel;
   a receiving pan including a plurality of receiving pan sections;
   a vapor-liquid separation device having an inlet surface proximate to the co-current flow channel and an outlet surface above the receiving pan; and
   a plurality of ducts, wherein each duct has an upper end in fluid communication with a respective receiving pan section and a lower end in fluid communication with a selected downcomer cell in an immediately inferior stage.

12. The apparatus of claim 11 wherein the plurality of downcomer cells in each downcomer in the selected stage extend in a direction, and wherein the plurality of downcomer cells in each downcomer in the stage immediately inferior to the selected stage extend in a transverse direction.

13. The apparatus of claim 12 wherein the transverse direction is perpendicular to the direction.

14. The apparatus of claim 13 wherein, for each contacting module, each receiving pan extends substantially parallel to the downcomer.

15. The apparatus of claim 11 wherein each stage includes a plurality of contacting modules.

16. The apparatus of claim 15 wherein each downcomer is positioned between two adjacent receiving pans.

17. The apparatus of claim 11 wherein each downcomer cell has a length of less than about 24 inches and each receiving pan segment has a length of less than about 24 inches.

18. The apparatus of claim 11 wherein a plurality of downcomer baffles define the downcomer cells within the downcomer and a plurality of receiving pan baffles define the receiving pan segments.

19. An offshore co-current vapor-liquid contacting apparatus comprising a plurality of stages, wherein each stage includes at least one contacting module comprising:
   a downcomer including downcomer cells, wherein each downcomer cell has an outlet proximate to a co-current flow channel;
   a receiving pan including receiving pan sections;
   a vapor-liquid separation device having an inlet surface proximate to the co-current flow channel and an outlet surface above the receiving pan;
   a plurality of ducts in fluid communication with respective receiving pan sections and selected downcomer cells in the immediately inferior stage; and
   means for inhibiting liquid flow from a first downcomer cell to adjacent downcomer cells and for inhibiting liquid flow from a first receiving pan section to adjacent receiving pan sections.

20. The apparatus of claim 19 wherein the first downcomer in the selected stage extends in a first direction and wherein the first downcomer in the stage immediately inferior to the selected stage extends in a transverse direction substantially perpendicular to the direction.

* * * * *